United States Patent
Norsk et al.

(10) Patent No.: US 8,127,535 B2
(45) Date of Patent: Mar. 6, 2012

(54) METHOD AND SYSTEM FOR PURIFICATION OF EXHAUST GAS FROM DIESEL ENGINES

(75) Inventors: Jesper Norsk, Humlebæk (DK); Keld Johansen, Frederikssund (DK); Ioannis Gekas, Malmö (SE)

(73) Assignee: Haldor Topsøe A/S, Lyngby (DK)

( * ) Notice: Subject to any disclaimer, the term of this patent is extended or adjusted under 35 U.S.C. 154(b) by 597 days.

(21) Appl. No.: 12/342,924

(22) Filed: Dec. 23, 2008

(65) Prior Publication Data

US 2009/0178393 A1    Jul. 16, 2009

(30) Foreign Application Priority Data

Jan. 10, 2008    (DK) .................................. 2008 00039

(51) Int. Cl.
*F01N 3/00* (2006.01)
*F01N 3/10* (2006.01)
*F28F 3/00* (2006.01)

(52) U.S. Cl. ............... 60/286; 60/295; 60/297; 60/299; 165/166

(58) Field of Classification Search ............. 60/286; 165/164, 165, 166
See application file for complete search history.

(56) References Cited

U.S. PATENT DOCUMENTS

| 837,146 | A | * | 11/1906 | Theryo | 165/166 |
| 3,490,523 | A | * | 1/1970 | Esmond | 165/166 |
| 3,867,508 | A | | 2/1975 | Hass | |
| 4,041,591 | A | * | 8/1977 | Noll et al. | 29/890.034 |
| 5,303,771 | A | * | 4/1994 | Des Champs | 165/165 |
| 5,823,247 | A | * | 10/1998 | Weibler | 165/76 |
| 6,347,511 | B1 | | 2/2002 | Haines | |
| 6,709,640 | B1 | * | 3/2004 | Romatier et al. | 422/200 |
| 6,840,313 | B2 | * | 1/2005 | Abiko et al. | 165/166 |
| 7,275,366 | B2 | * | 10/2007 | Powell et al. | 60/320 |
| 2004/0159096 | A1 | * | 8/2004 | Yasui et al. | 60/286 |
| 2005/0098042 | A1 | | 5/2005 | Colamussi | |
| 2005/0173103 | A1 | * | 8/2005 | Dawson | 165/166 |
| 2006/0059897 | A1 | * | 3/2006 | Benz et al. | 60/286 |
| 2006/0096282 | A1 | | 5/2006 | Friedrich et al. | |
| 2006/0196176 | A1 | * | 9/2006 | Karlsson et al. | 60/297 |
| 2006/0196649 | A1 | * | 9/2006 | Shibata et al. | 165/166 |
| 2006/0213197 | A1 | * | 9/2006 | Caro et al. | 60/685 |

(Continued)

FOREIGN PATENT DOCUMENTS

EP    0 592 713 A1    4/1994

(Continued)

*Primary Examiner* — Thomas Denion
*Assistant Examiner* — Jason Shanske
(74) *Attorney, Agent, or Firm* — Dickstein Shapiro LLP (57) ABSTRACT

The invention provides a method and system for purification of a carbon monoxide, nitrogen oxides, incompletely combusted hydrocarbons and soot containing exhaust gas from a combustion engine comprising the steps of catalytically oxidizing the carbon monoxide in the exhaust gas, retaining soot and remaining amounts of hydrocarbons in the oxidised exhaust gas in a filter, addition of a reducing agent to gas and catalytically reducing nitrogen oxides, and obtaining a purified exhaust gas. The invention further comprises the steps of controlling a temperature in the oxidising catalyst by passing at least a part of the gas from the engine through a first side of a heat exchanger, and passing at least a part of the purified exhaust gas through a second side of the heat exchanger, and leading the remaining amount of the gas from the engine through a by-pass across the first side of the heat exchanger and leading the remaining amount of the purified exhaust gas through a by-pass across the second side of the heat exchanger.

9 Claims, 6 Drawing Sheets

U.S. PATENT DOCUMENTS

| | | |
|---|---|---|
| 2006/0236680 A1 * | 10/2006 | Zhang et al. .................. 60/286 |
| 2006/0278368 A1 * | 12/2006 | Dawson ......................... 165/84 |
| 2007/0059227 A1 | 3/2007 | Okajima |
| 2007/0084591 A1 * | 4/2007 | Siverklev ..................... 165/165 |
| 2007/0089717 A1 * | 4/2007 | Saele ....................... 123/568.12 |
| 2007/0125072 A1 * | 6/2007 | McCarthy et al. ............. 60/286 |
| 2007/0137184 A1 * | 6/2007 | Patchett et al. ................ 60/286 |
| 2007/0221366 A1 * | 9/2007 | Murayama et al. ........... 165/166 |

FOREIGN PATENT DOCUMENTS

| | | |
|---|---|---|
| EP | 1 612 382 A2 | 1/2006 |
| JP | 56020997 A * | 2/1981 |
| JP | 59230625 A * | 12/1984 |
| JP | 2005-299474 | 10/2005 |
| WO | WO 94/11623 A2 | 5/1994 |

* cited by examiner

METHOD AND SYSTEM FOR PURIFICATION OF EXHAUST GAS FROM DIESEL ENGINES

BACKGROUND OF THE INVENTION

1. Field of the Invention

The invention relates to efficient purification of exhaust gas.

The invention is specifically directed to a method and a system for removal of nitrogen oxides, carbon monoxide, soot and remains of hydrocarbons from exhaust gas from diesel engines.

The invention is especially useful for vehicles driven by diesel engines, which frequently start with cold engine, or at places where several cold diesel engines start during a day.

2. Description of Related Art

Methods for purification of exhaust gas is known in the art, also methods including devices taking needed and created heat into account.

US patent application No. 2006/0096282 discloses purification of exhaust gas in an apparatus with parallel channels, where the ingoing exhaust gas flows in every second channel and the outgoing in the other channels. The gas stream turns in a chamber, where heat is added by a burner. The exhaust gas is cleaned by catalysts placed in the last part of the channels upstream of the chamber and placed in the first part of the channels downstream of the chamber. In the empty part of the channels heat is transferred between the dirty exhaust gas and the purified exhaust gas. In this way the performance of the apparatus is adjusted by the fuel consuming burner in the middle of it.

Also patent specification US 20070059227 discloses exhaust gas purification, where the exhaust gas is passed through a diesel particulate filter, an oxidation catalyst and subsequently through $NO_x$ purification. The gas entering the $NO_x$ purification is heat exchanged with the gas leaving the $NO_x$ purification, where heat is developed by combustion. In this way, some energy is saved for obtaining a correct temperature of the last of three steps of the purification.

Engine exhaust gas is purified in a system comprising heater, thermal mass and fluid cooled heat exchanger besides the purification catalysts in the process of U.S. Pat. No. 6,347,511. Upstream of the system, the exhaust gas passes partly or entirely through a heat exchanger, where the gas is cooled or heated, in the latter case energy must be added to the system.

A diesel particulate filter purifies exhaust gas by a process described in JP 2005299474. Part of the gas, which leaves the filter, passes through an annular space around part of the inlet pipe to the filter. Thus, the entire inlet stream is heated by the amount of heat, which is able to be transferred through that part of the inlet pipe.

Another exhaust gas filter system is described in US 2005/0098042. This engine exhaust gas stream can be entirely or partly passed through a heat exchanger upstream of a filter. The heat exchanger is typically an air/gas heat exchanger with the gas in tubes meaning that the heat transfer is dependent of the ambient air.

Some of the processes of prior art need additional energy supply to obtain correct catalyst or soot combustion temperatures, some of the processes recover heat to a certain degree by transfer through surfaces of limited area, and some processes recover heat in exchangers, which create relatively high pressure loss of the exhaust gas.

The present invention relates to a purification method and system possessing high degree of exhaust gas purification and high degree of heat recovery during all engine operating modes simultaneously with creating only a minimum of pressure loss in the exhaust gas.

SUMMARY OF THE INVENTION

The invention provides a method and system for purification of a carbon monoxide, nitrogen oxides, incompletely combusted hydrocarbons and soot containing exhaust gas from a combustion engine and comprises the steps of oxidising the carbon monoxide in the exhaust gas in presence of an oxidising catalyst retaining soot and remaining amounts of hydrocarbons in the oxidised exhaust gas in a filter, controlled addition of a reducing agent to gas from the filter and reducing nitrogen oxide and nitrogen dioxide to nitrogen in presence of a selective reducing catalyst, and obtaining a purified exhaust gas. The invention further comprises the steps of controlling a temperature in the oxidising catalyst by passing at least a part of the gas from the engine through a first side of a heat exchanger and passing at least a part of the purified exhaust gas through a second side of the heat exchanger and leading the remaining amount of the gas from the engine through a by-pass across the first side of the heat exchanger and leading the remaining amount of the purified exhaust gas through a by-pass across the second side of the heat exchanger.

The heat exchanger comprises a housing, a number of rectangular plates installed in parallel in the housing, a plurality of wires between the plates, the wires being tightly squeezed between the plates, so two adjacent wires and the surrounding plates form channels. The wires in every second space between the plates are placed essentially in parallel with each other and in an S-shape, so the channels lead a gas stream from one corner of the plates to a diametrically opposite corner. The wires in remaining spaces between plates are placed so the channels form a shape being a mirror image of the shape of the other channels and inlets of both streams are positioned on the same side of the housing, thereby obtaining essentially counter-current gas flow through channels in adjacent spaces between plates.

The invention may comprise controlled addition of fuel to the exhaust gas effluent from the first side of the heat exchanger and/or the by-pass across the first side of the heat exchanger and then oxidising the fuel in the subsequent oxidising step.

DETAILED DESCRIPTION OF THE INVENTION

Diesel engines operate with excess air and their exhaust gasses comprise nitrogen oxides, $NO_x$, carbon monoxide, CO, soot and incompletely combusted hydrocarbons, which all implement health risk.

These impurities have to be removed, and in the present invention it is chosen to oxidise CO subsequently to catch soot and incompletely combusted hydrocarbons in a filter, and finally to catalytically reduce nitrogen oxides to free nitrogen. These reactions take place in an optimal way, when the exhaust gas and the system are heated up to 300-400° C.

The invention provides a method and apparatus, which shorten the time from start of a cold engine and until the required temperatures are reached. This is obtained by installing a feed/effluent heat exchanger across the purification system. The heat exchanger is equipped with by-pass both on the feed side and on the effluent side and with at least one vane in each by-pass.

The invention is further described by the drawings.

Figure 1:
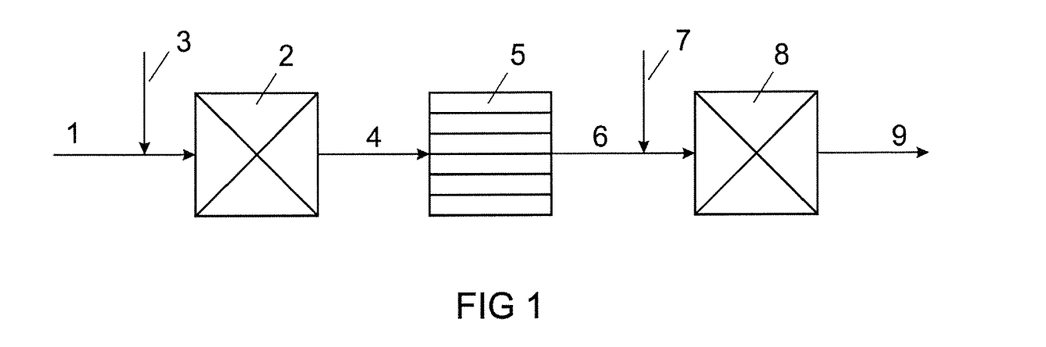
FIG. 1 is a schematic drawing showing chemical processes of the system of the invention.

The part of the system of the invention, where the purification takes place is shown in FIG. 1.

Exhaust gas stream 1 from an engine flows to a diesel oxidation catalyst, DOC 2, where CO is oxidised to $CO_2$, which at least is not harmful to the health. Also NO is oxidised to $NO_2$ in the DOC. These reactions perform optimally at 300-350° C. In order to maintain this temperature at all conditions, some fuel 3 can be injected upstream of the catalyst 2 and be catalytically combusted under heat formation. This catalytic combustion is possible at around 200° C. and above. Normally the gas is 350° C., when leaving the DOC 2 in stream 4.

Soot and incompletely combusted hydrocarbons in the form of particles in stream 4 are caught in a diesel particulate filter, DPF 5. The filter can be coated with a layer of a catalytic material which oxidises, i.e. burns off soot at and above 350° C. The filter 5 is thereby self-regenerating, and when the engine is running in a stable mode, the exhaust gas leaves the filter at 350° C. As DPF 5 is installed downstream of the DOC, where $NO_2$ is formed, and as $NO_2$ is an oxidant, $NO_2$ from the DOC makes the DPF self-regene-rating at temperatures of 250-350° C. dependent of the $NO_2$ content.

The oxidised and filtered gas 6 still contains $NO_x$, which is selectively catalytically reduced (SCR) by ammonia in the presence of an SCR-catalyst 8. Most often ammonia is added as an aqueous solution of urea 7, which is thermally decomposed, and which is easier to store than ammonia in a vehicle compartment. This urea decomposition takes place at 180-200° C. and above. Alternatively, ammonia formate can be used as reducing agent. The reduction of $NO_x$ is optimally conducted at 350° C. and the purified exhaust gas 9 leaves the SCR catalyst at 350° C.

When a cold diesel engine is started and the exhaust gas purification system is cold as well, the system shown in FIG. 1 is about 180° C., as shown in Table 1.

In this typical low temperature operating case we have the following situation:

DOC 2 has too low temperature to start fuel combustion to elevate the temperature. The temperature of DPF 5 is too low to combust soot, which accumulates in the filter, and pressure drop builds up. The higher the pressure drop is, the higher the fuel penalty, i.e. requirement of additional fuel, the diesel engine will experience. If the pressure drop reaches high levels, the system has to be forced to be regenerated by increasing the temperature of the whole exhaust system. This can in this case be done by changing the operating parameters for the engine. Low temperature in stream 6 prevents fully conversion of urea to ammonia, which is needed for the SCR catalyst 8 to remove $NO_x$. This creates risk to form deposits in the exhaust pipes and high slip levels of ammonia, and, further, the SCR catalyst 8 is not very efficient in removing $NO_x$ at low temperatures.

Still referring to FIG. 1 after start of the engine when the DOC 2 is heated to 250° C. by the exhaust gas 1 leaving the engine, the exothermal reaction with fuel can be started in the DOC 2, and the formed heat raises the temperature of the exhaust gas. In DPF 5 the temperature level is then sufficient to combust soot at the same rate as it is deposited on the filter. Constant passive regeneration is a key element of the invention. In this way the filter is not accumulating any soot resulting in a low steady pressure drop for the diesel engine purification system, and there is no longer any need for forced soot regeneration. The temperature outlet DPF 5 is 350° C., which is a good temperature for converting urea to ammonia for the SCR catalyst 8 without risk of deposits in the pipes. Optimal operating temperature for the SCR catalyst 8 is obtained, and by this an excellent NOx conversion is achieved with only a limited ammonia slip.

The temperatures obtained with a warm engine are shown in Table 1.

Until the above temperatures are reached, untreated, poisonous exhaust gas is sent to the atmosphere.

TABLE 1

|  | Stream No. | | | |
| --- | --- | --- | --- | --- |
|  | 1 | 4 | 6 | 9 |
| Cold engine | 180° C. | 180° C. | 180° C. | 180° C. |
| Warm engine | 250° C. | 350° C. | 350° C. | 350° C. |

Figure 2:
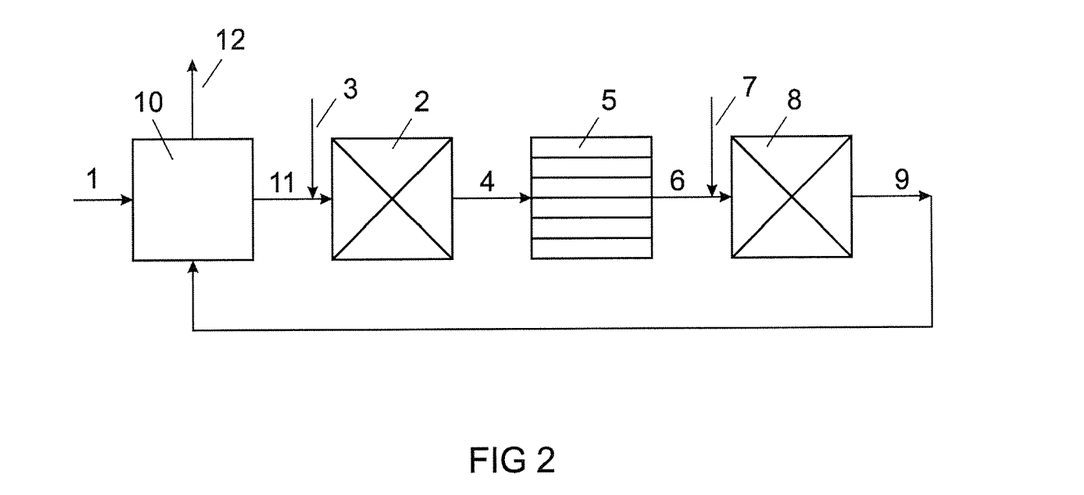
FIG. 2 is a schematic drawing showing the system of the invention.

The invention provides a method and apparatus, which shorten the time from start of a cold engine and until 250° C. for DOC-catalyst is obtained, and which keep the temperature of the DOC at or above 250° C. with only a limited or even without fuel addition upstream of the DOC. This is obtained by installing a feed/effluent heat exchanger across the purification system, which is shown in FIG. 2. The exhaust gas 1 enters a feed/effluent heat exchanger 10. When a warm engine is running with warm exhaust gas purification system, the heat in stream 9 created by the purification system, is used to heat the feed exhaust gas 1 in the feed/effluent heat exchanger 10. Exhaust gas stream 11 is by this heated to 320° C., which decrease the need of fuel to be added upstream of the DOC 2 for reaching optimal reaction temperatures. The purified exhaust gas 9 flows at 350° C. to the other side of the heat exchanger 10, from where the gas stream 12 leaves at 230° C. These temperatures are shown in Table 2.

The requirement for optimised system performance at a limited additional fuel cost is to include a highly-efficient counter-current flow heat exchanger in the setup. The heat exchanger needs to have a high heat efficiency to recover most of the heat of the effluent gases. At the same time, the heat exchanger must only create a minimum of pressure drop. By this, optimal, efficient exhaust gas cleaning is quickly obtained.

TABLE 2

| | Stream No. | | | | | |
|---|---|---|---|---|---|---|
| | 1 | 11 | 4 | 6 | 9 | 12 |
| System with heat exchanger | 200° C. | 320° C. | 350° C. | 350° C. | 350° C. | 230° C. |

Figure 3:
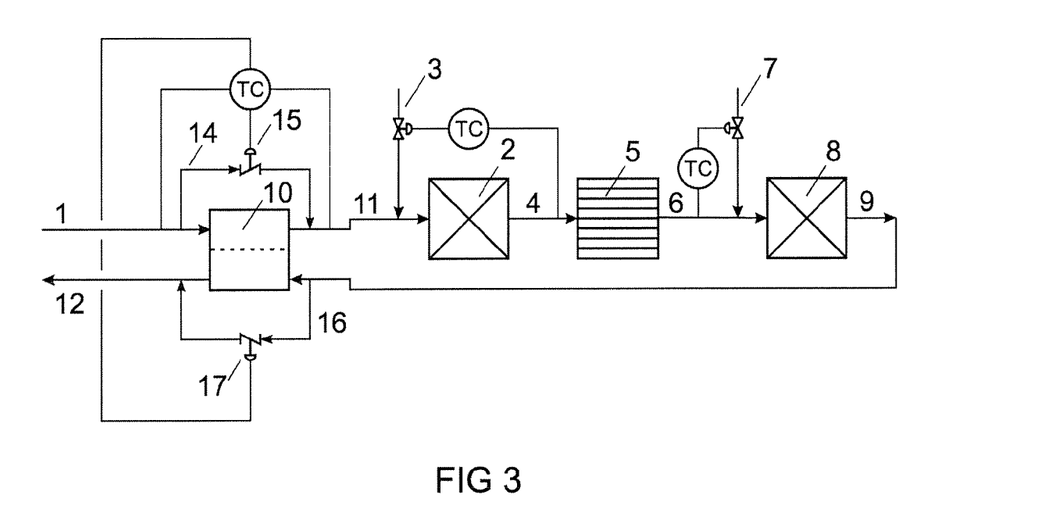
FIG. 3 is a diagram showing the system according to one embodiment of the invention and the control principles of this embodiment.

To further optimize the total system operation and minimize unnecessary pressure drop over the heat exchanger the heat exchanger is equipped with by-pass both on the feed side and on the effluent side. The heat exchanger can then be bypassed, when not needed for the system operation. The preferred system design is shown in FIG. 3. On the engine effluent side of the heat exchanger, by-pass 14 is installed, equipped with a vane 15 and on the warm, purified effluent side, by-pass 16 equipped with vane 17 is installed.

The position of the vanes is controlled by the temperature of the engine effluent gas and of the temperature of the exhaust gas upstream of the DOC catalyst.

The temperature of exhaust gas 4 outlet of the DOC is measured and the signal is used for automatic control of addition of fuel 3 for oxidising, when this is possible and needed.

Similarly, the temperature of exhaust gas 6 inlet of the SCR catalyst is measured. The temperature signal is used for controlling that the urea solution 7 is not injected, when the temperature is too low.

Figure 4:
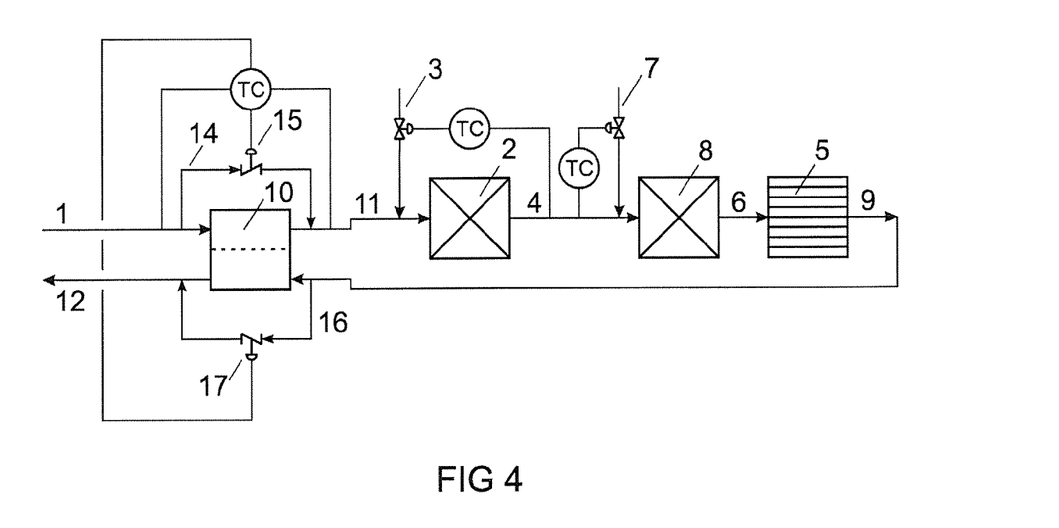
FIG. 4 is a diagram showing the system according to another embodiment of the invention and the control principles of this embodiment.

Another embodiment of the invention is shown in FIG. 4. In this purification process, the exhaust gas 4 flows from the DOC to the SCR and thereafter to the DPF. This has the advantage that $NO_2/NO_x$ ratio is easier to control. The DPF of this embodiment must operate at a higher temperature.

When the heat exchanger is not needed, it is by-passed and unnecessary pressure drop is avoided.

When the engine outlet exhaust temperature is above 350° C., there is no need to add more heat to the system since the catalysts already operate optimally. The fuel injection is stopped and the heat exchanger is bypassed on both sides, avoiding the pressure drop otherwise created in the heat exchanger.

When the temperature of the DOC is too low (below ca 200° C. depending on composition) the DOC cannot combust diesel fuel. Diesel fuel can therefore not be added before the DOC reaches its so called light off temperature. Since there is no created heat during such case, the heat exchanger should be bypassed on both sides having the further benefit that the exhaust heat directly goes to the DOC to reach the light off temperature as quickly as possible. When the DOC reaches light off temperature, diesel fuel can be added and the heat exchanger should be taken into operation by closing both by-pass vanes.

Now a substantial part of the heat to the DOC catalyst and to the rest of the purification system is taken from the heat exchanger by heat recovery of the heat in the purification effluent stream 9, instead from the fuel reacting in the DOC catalyst. This heat exchange decreases the fuel consumption.

Later, when the engine outlet exhaust temperature is above 350° C., then there is no need to add more heat to the system since the catalysts already operate optimally. The diesel injection is stopped and the heat exchanger is bypassed.

To control the bypassing of the heat exchanger, the following simple algorithm can therefore be used:

Inlet DOC temperature<Light-off temperature: opened by-pass vanes,

Inlet DOC temperature≧Light-off temperature: closed by-pass vanes,

Engine exhaust temperature<350° C.: closed by-pass vanes.

Engine exhaust temperature≧350° C.: opened by-pass vanes,

The requirements to the design of this feed/effluent heat exchanger are self-contradicting. The heat exchanger must be efficient, i.e. a very good heat transfer must be obtained, the heat exchanger must be as small as possible, and, on the other hand, the created pressure drop in the heat exchanger must be very low.

Figure 5:
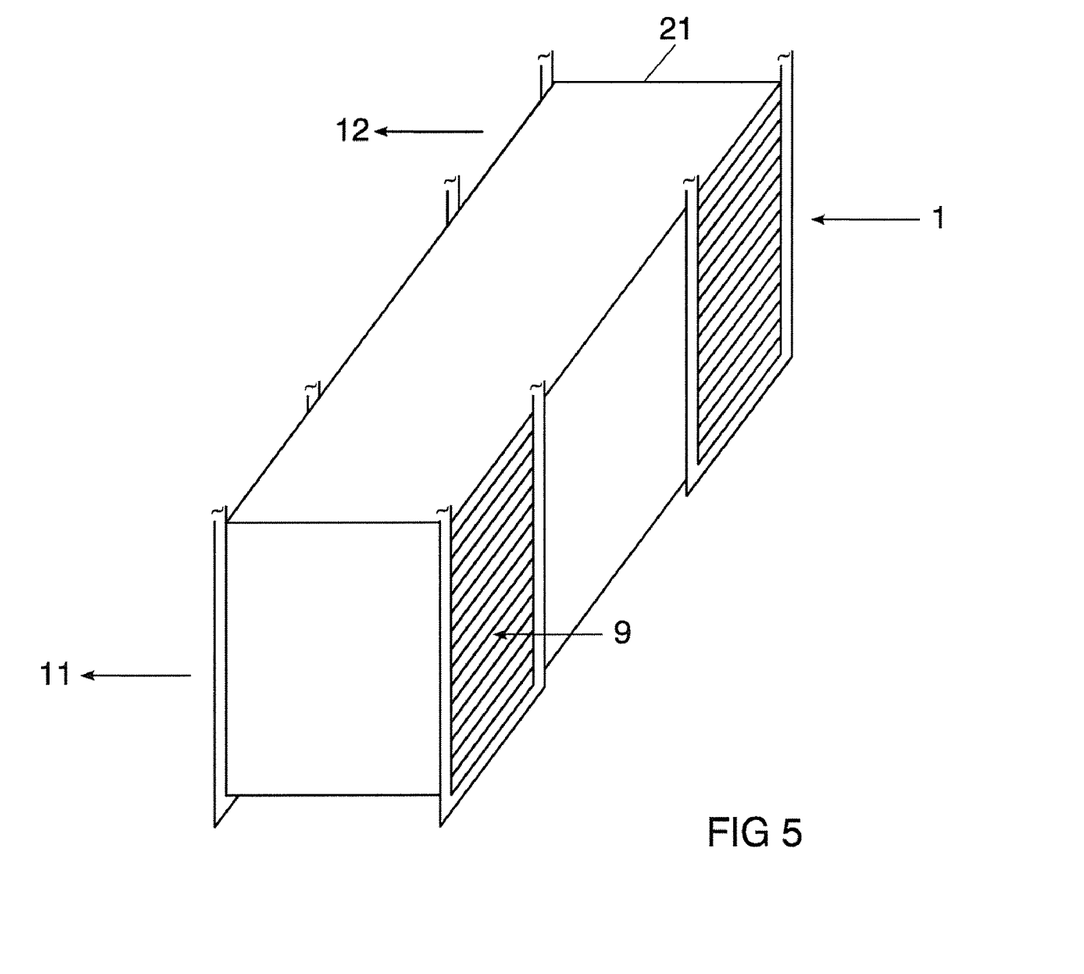
FIG. 5 is a drawing showing a 3-dimensional view of a heat exchanger of the invention.

Such requirements are obtained with the heat exchanger of the invention. FIG. 5 shows the heat exchanger with housing 21 and, where the exhaust gas 1, which is fed to the purification, flows into the heat exchanger and leaves it heated as stream 11, while the purified stream 9 is cooled in the heat exchanger and leaves the whole system as stream 12.

Figure 6:
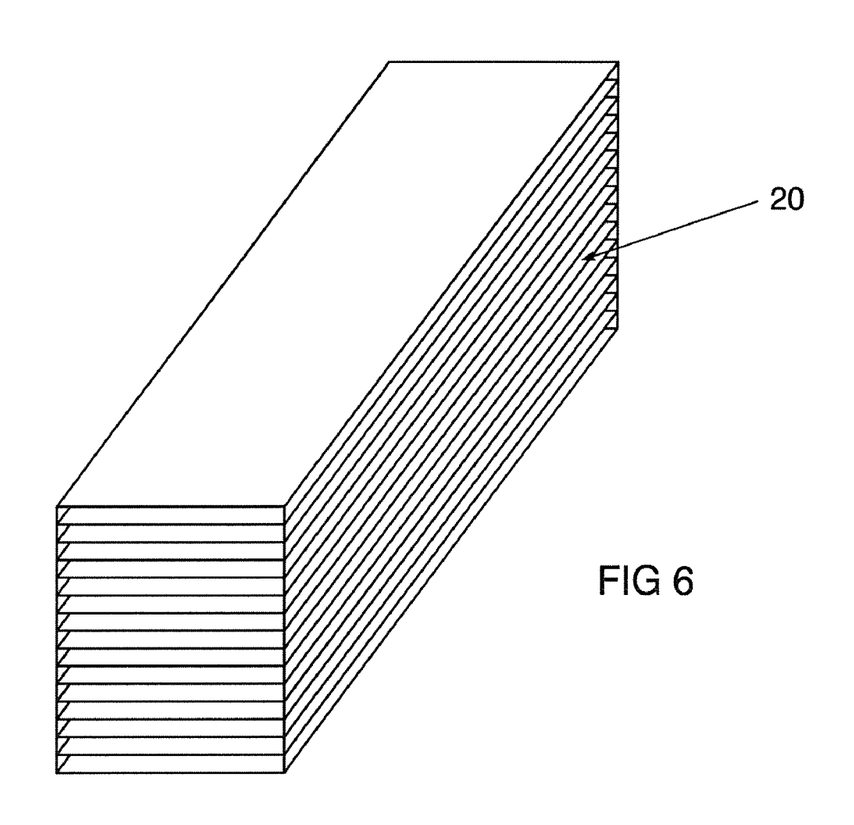
FIG. 6 is a drawing showing cross section of a heat exchanger according to the invention.

FIG. 6 illustrates that the heat exchanger comprises a number of thin, metallic plates 20 installed in parallel, which are kept apart from each other by a plurality of metallic wires. When the plates are rectangular, the housing has the shape of a box.

Figure 7:
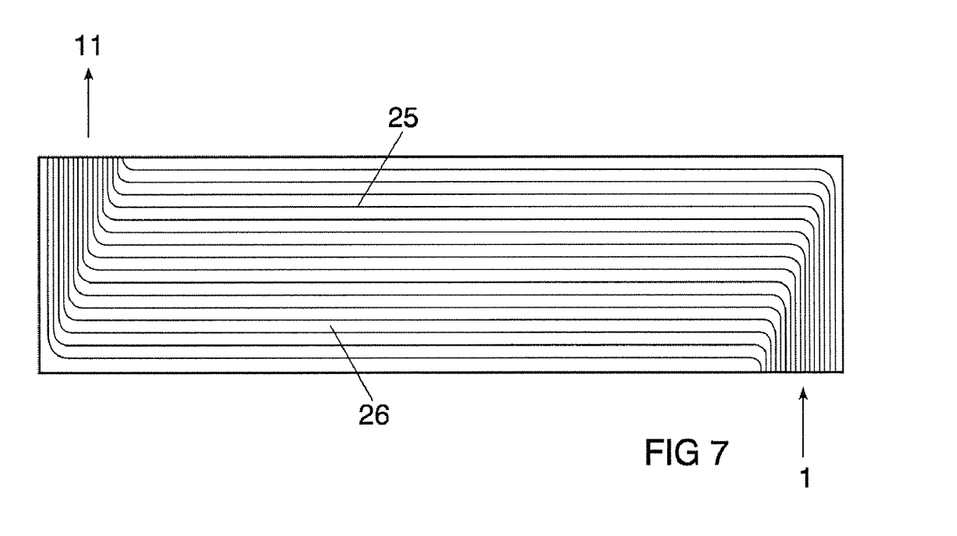
FIG. 7 is a drawing showing another cross section of a heat exchanger of the invention.

FIG. 7 shows the wires 25, which are thicker than the plates. The wires are placed in parallel with each other and each is forming an S. When the wires are squeezed between two plates, the wires and the plates form a plurality of channels 26. In every second layer, the channels have a form as an S, and in the other layers the shape of the channels form mirror image of an S. In the straight part of the channels 26, the feed flow and the effluent flow on each side of a plate flow in counter-current making the heat exchanger very efficient.

Figure 8:
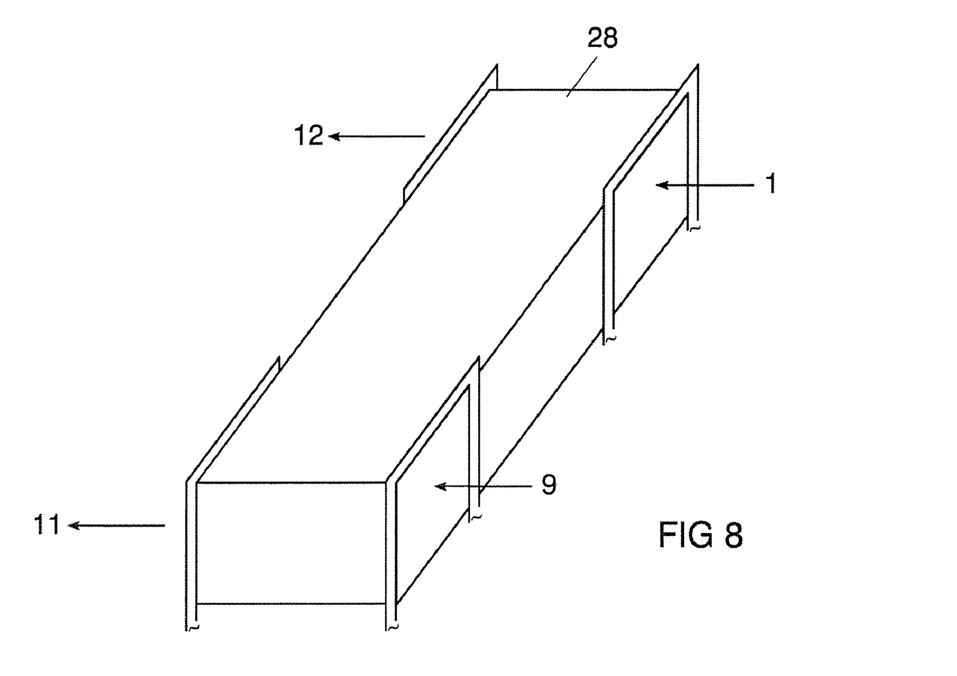
FIG. 8 is a drawing showing a 3-dimensional view of by-passes of the invention.

FIG. 8 shows a box 28, which contains the flow passages for the two by-pass streams, the purification feed stream 1 and the purification effluent stream 9 enter the by-pass box from the same side and leave as streams 11 and 12, respectively.

Figure 9:
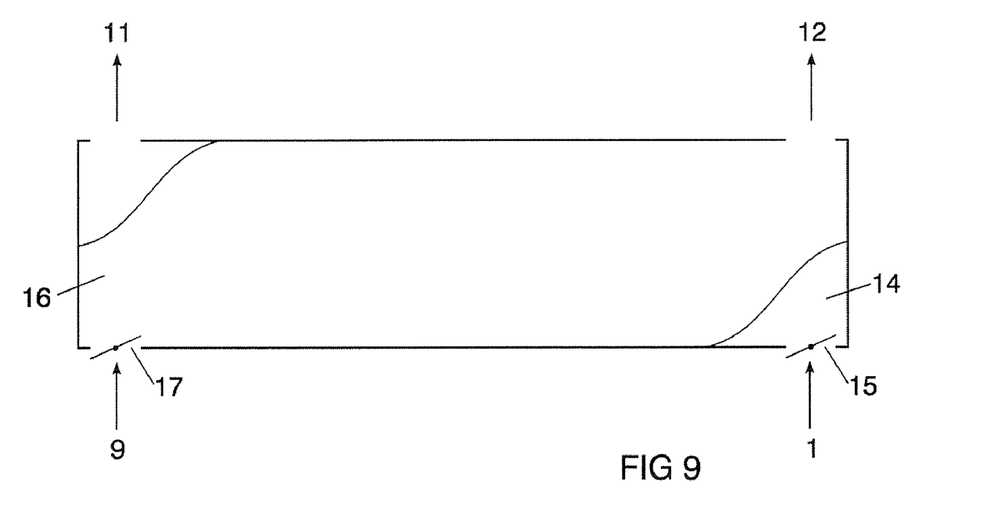
FIG. 9 is a drawing showing cross section of by-passes of the invention.

FIG. 9 illustrates the by-pass channels seen from above, from where it appears how the streams flow. To control the amount of gas which flows in the by-pass channels, one or more vanes are installed in each channel. In FIG. 9, one vane in each channel is shown, vane 15 is installed in by-pass 14 and vane 17 is installed in by-pass 16, which control the amounts of gas by-passing the heat exchanger on both sides.

The box is elongated, and the two inlets are situated on one long side and the two outlets are situated on the opposite side.

In the box, the two channels are separated from each other by a plate going from one end to the other. In a box, where the streams enter and leave horizontally, the channels are separated at the ends by a vertical part of the plate. The whole plate twists 180°, so f.inst. in the middle of the box the plate is horizontal. In this way, the inlets and outlets of the by-passes are situated just next to the corresponding inlets and outlets of the heat exchanger.

Figure 10:
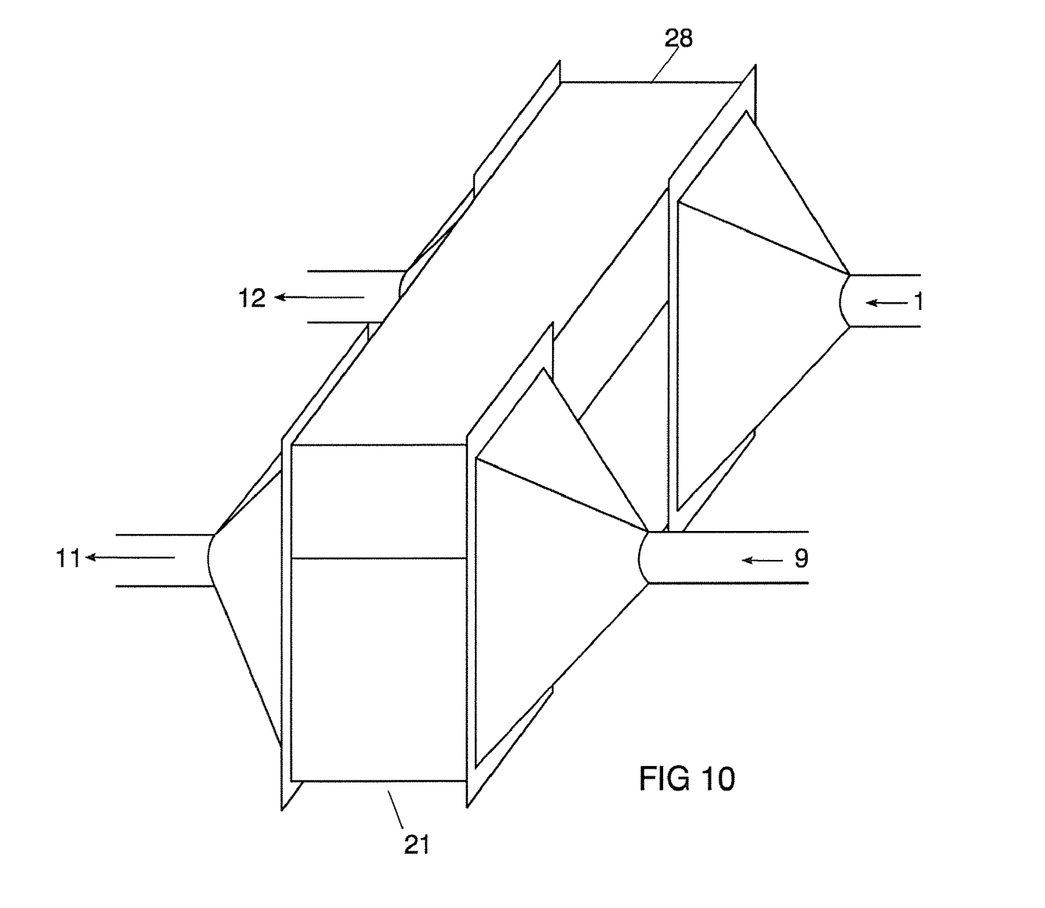
FIG. 10 is a drawing showing a 3-dimensional view of the by-passes installed on the heat exchanger of the invention.

FIG. 10 illustrates how the by-pass channels are built on the heat exchanger, which saves much space. By-pass box 28 is installed on top of exchanger housing 21. Stream 9 flows in a common inlet cone to the heat exchanger and to the by-pass, similarly from FIG. 10 it is seen that also stream 1 flows into and streams 11 and 12 flow out of common inlet and outlet cones, respectively.

In another embodiment of the invention, the surface of the feed side of the heat exchanger is covered by a layer of DOC. This enables an even quicker heating of the purification system.

In yet another embodiment, the diesel particulate filter is at least partly covered by a layer of SCR-catalyst, and a separate device for SCR is avoided.

In yet another embodiment, the SCR of $NO_x$ is installed up-stream of the DPF.

In yet another embodiment of the invention, an ammonia slip catalyst can be installed either as a separate catalyst downstream of the SCR catalyst or as a downstream part of the SCR catalyst.

The method and system of the invention is useful for purification of exhaust gasses from diesel engines, especially from engines, which frequently start with a cold motor.

EXAMPLE

One embodiment of the invention is described below. It is useful for cleaning 500 kg/h exhaust gas from a diesel engine.

The system comprises DOC with upstream fuel injection, DPF, SCR with upstream urea solution injection, feed/effluent heat exchanger for this purification section, by-pass channel on feed and on effluent side of the heat exchanger and vanes in each bypass channel. This system is shown in FIG. 3.

The size of the exhaust gas pipe is 4" (100 mm), which is enlarged to 10"-12" (250 mm-300 mm), where the DOC, DPF and SCR catalyst are installed.

The heat exchanger, which is installed around the purification system of a big van with a 12 l engine, consists of 200 plates, which each is 200×800 mm and 0.2 mm thick. Between the plates 1 mm thick wires are installed in the kind of S-shape as shown in FIG. 7 the space between two wires is 19 mm. This heat exchanger has thereby approximately the size 200×800×240 mm, and the plates and wires are suitably made from Cr steel SS 409.

On top of this heat exchanger, the box of the by-passes is installed as shown on FIG. 10. The by-pass box is 120 mm high, whereas the length and the width are the same as for the heat exchanger.

Test Results

Tests were conducted with exhaust gas from a 12 l diesel engine from a big van.

The exhaust gas was passed through one side of a heat exchanger, fuel was subsequently added before oxidation over a DOC, and the oxidised exhaust gas was cooled in the other side of the heat exchanger, thereby heating the gas from the engine to the DOC. The heat exchanger was equipped with a by-pass on each side.

The heat exchanger and the piping around it were insulated, however, with a thinner layer of insulation than a layer, which will be used in a vehicle.

The test results are given in Table 3, where ΔP is pressure drop over the cold side of the heat exchanger, T1, T2, T3 and T4 are temperatures inlet cold side of heat exchanger, outlet cold side of heat exchanger, inlet warm side of heat exchanger and outlet warm side of heat exchanger, respectively; and where "DOC before" means temperature inlet DOC, "DOC after" means temperature outlet DOC and HEX position (operation mode) is given as by-pass valves closed, C, or by-pass valves open, O. It appears clearly, that a heater creates some pressure drop compared with operation with open by-pass valve.

The tests show that even with very cold engine exhaust, i.e. far below where fuel can be catalytically oxidised and create heat, the DOC will perform when a heater is installed.

Especially, test run at 14:56 shows that with gas exhausted from engine at 171° C. and with the heater in line 348° C. are obtained outlet DOC, which is the optimal temperature for a Diesel Particulate Filter, which most often follows after a DOC, to burn off solid impurities.

This is in contrast to test run at 15:04, where the engine exhaust is 243° C., but where the heat exchanger is by-passed resulting in a DOC outlet temperature of 272° C., where no soot or other solid hydrocarbon remains would be burned off in a subsequent diesel particulate filter.

TABLE 3

Test I Lund
Scania 12 l
HEX + HCinj + DOC

| Time | HEX position | Δp mBar | T1 °C. | T2 °C. | TDOC before °C. | HC inj | TDOC after °C. | T3 °C. | T4 °C. | RPM 1/min | Torque Nm | T2 − T1 °C. | T3 − T4 °C. | Heat transfer (T2 − T1)/ (T3 − T4) | Efficiency heating (T2 − T1)/ (T3 − T1) gas from engine | Efficiency cooling (T3 − T4)/ (T3 − T1) gas from DOC | ΔT DOC °C. |
|---|---|---|---|---|---|---|---|---|---|---|---|---|---|---|---|---|---|
| 14:25 | C | 152.00 | 365 | 335 | 324 | + | 402 |  | 337 | 1230 | 500 | −30 |  |  |  |  |  |
| 14:30 | C | 152.00 | 366 | 336 | 325 | + | 401 | 369 | 338 | 1230 | 500 | −30 | 31 | −0.97 | −10.00 | 10.33 | 76 |
| 14:35 | C | 152.00 | 367 | 335 | 327 | + | 399 | 368 | 338 | 1230 | 500 | −32 | 30 | −1.07 | −32.00 | 30.00 | 72 |
| 14:40 | C | 131.00 | 298 | 320 | 315 | + | 395 | 361 | 302 | 1230 | 290 | 22 | 59 | 0.37 | 0.35 | 0.94 | 80 |
| 14:42 | C | 131.00 | 291 | 316 | 311 | + | 396 | 362 | 296 | 1230 | 290 | 25 | 66 | 0.38 | 0.35 | 0.93 | 85 |
| 14:44 | C | 120.00 | 244 | 304 | 301 | + | 394 | 360 | 274 | 1230 | 180 | 60 | 86 | 0.70 | 0.52 | 0.74 | 93 |
| 14:45 | C | 120.00 | 237 | 300 | 297 | + | 400 | 361 | 266 | 1230 | 180 | 63 | 95 | 0.66 | 0.51 | 0.77 | 103 |
| 14:49 | C | 107.00 | 185 | 289 | 291 | + | 400 | 363 | 242 | 1230 | 0 | 104 | 121 | 0.86 | 0.58 | 0.68 | 109 |
| 14:50 | C | 106.00 | 175 | 284 | 288 | + | 398 | 358 | 231 | 1230 | 0 | 109 | 127 | 0.88 | 0.60 | 0.69 | 110 |
| 14:51 | C | 104.00 | 167 | 279 | 284 | + | 399 | 360 | 225 | 1230 | 0 | 112 | 135 | 0.83 | 0.58 | 0.70 | 115 |
| 14:52 | C | 113.00 | 211 | 281 | 283 | + | 390 | 356 | 231 | 1230 | 180 | 70 | 125 | 0.56 | 0.48 | 0.86 | 107 |
| 14:56 | C | 117.00 | 226 | 171 | 272 | + | 348 | 323 | 241 | 1230 | 180 | −55 | 82 | −0.67 | −0.57 | 0.85 | 76 |
| 14:57 | C | 117.00 | 228 | 269 | 271 | + | 349 | 320 | 241 | 1230 | 180 | 41 | 79 | 0.52 | 0.45 | 0.86 | 78 |
| 15:04 | O | 6.80 | 243 | 230 | 227 |  | 272 | 240 | 231 | 1230 | 180 | −13 | 9 | −1.44 | 4.33 | −3.00 | 45 |
| 15:05 | O | 6.70 | 252 | 238 | 237 |  | 339 | 302 | 281 | 1230 | 310 | −14 | 21 | −0.67 | −0.28 | 0.42 | 102 |
| 15:26 | O | 7.42 | 267 | 238 | 229 |  | 226 | 199 | 182 | 1230 | 450 | −29 | 17 | −1.71 | 0.43 | −0.25 | −3 |
| 15:28 | O | 7.70 | 281 | 256 | 250 | + | 259 | 232 | 212 | 1230 | 450 | −25 | 20 | −1.25 | 0.51 | −0.41 | 9 |
| 15:34 | O | 8.34 | 294 | 276 | 271 | + | 365 | 343 | 311 | 1230 | 430 | −18 | 32 | −0.56 | −0.37 | 0.65 | 94 |
| 15:40 | O | 8.46 | 294 | 284 | 273 | + | 400 | 370 | 339 | 1230 | 430 | −10 | 31 | −0.32 | −0.13 | 0.41 | 127 |
| 15:42 | O | 8.61 | 294 | 286 | 276 | + | 406 | 387 | 353 | 1230 | 430 | −8 | 34 | −0.24 | −0.09 | 0.37 | 130 |
| 15:44 | O | 7.53 | 265 | 261 | 254 | + | 394 | 381 | 349 | 1230 | 310 | −7 | 32 | −0.22 | −0.06 | 0.28 | 140 |
| 15:46 | O | 7.18 | 247 | 249 | 240 | + | 380 | 373 | 344 | 1230 | 270 | 2 | 29 | 0.07 | 0.02 | 0.23 | 140 |
| 15:50 | O | 18.00 | 460 | 421 | 414 | + | 487 | 449 | 410 | 1230 | 1000 | −39 | 39 | −1.00 | 3.55 | −3.55 | 73 |
| 15:52 | O | 7.82 | 290 | 295 | 290 | + | 430 | 427 | 394 | 1230 | 270 | 5 | 33 | 0.15 | 0.04 | 0.24 | 140 |

TABLE 3-continued

Test I Lund
Scania 12 I
HEX + HCinj + DOC

| Time | HEX posi- tion | Δp mBar | T1 °C. | T2 °C. | TDOC before °C. | HC inj | TDOC after °C. | T3 °C. | T4 °C. | RPM 1/min | Torque Nm | T2 − T1 °C. | T3 − T4 °C. | Heat transfer (T2 − T1)/ (T3 − T4) | Efficiency heating (T2 − T1)/ (T3 − T1) gas from engine | Efficiency cooling (T3 − T4)/ (T3 − T1) gas from DOC | ΔT DOC °C. |
|---|---|---|---|---|---|---|---|---|---|---|---|---|---|---|---|---|---|
| 15:55 | O | 7.18 | 259 | 265 | 258 | + | 399 | 397 | 370 | 1230 | 270 | 6 | 27 | 0.22 | 0.04 | 0.20 | 143 |
| 15:56 | O | 7.19 | 254 | 257 | 253 | + | 400 | 392 | 368 | 1230 | 270 | 3 | 26 | 0.12 | 0.02 | 0.19 | 147 |
| 15:57 | C | 129.00 | 274 | 327 | 303 | + | 469 | 420 | 291 | 1230 | 270 | 53 | 129 | 0.41 | 0.36 | 0.88 | 166 |
| 15:59 | C | 129.00 | 272 | 335 | 329 | + | 470 | 423 | 292 | 1230 | 270 | 63 | 131 | 0.48 | 0.42 | 0.87 | 141 |
| 16:01 | C | 129.00 | 273 | 326 | 325 | + | 431 | 394 | 289 | 1230 | 270 | 53 | 105 | 0.50 | 0.44 | 0.87 | 106 |
| 16:02 | C | 129.00 | 274 | 322 | 320 | + | 425 | 385 | 288 | 1230 | 270 | 48 | 97 | 0.49 | 0.43 | 0.87 | 105 |
| 16:04 | C | 129.00 | 272 | 309 | 308 | + | 350 | 335 | 280 | 1230 | 270 | 37 | 55 | 0.67 | 0.59 | 0.87 | 42 |
| 16:06 | C | 119.00 | 244 | 286 | 249 | + | 343 | 320 | 264 | 1230 | 150 | 42 | 58 | 0.75 | 0.55 | 0.74 | 94 |
| 16:07 | C | 116.00 | 233 | 273 | 272 | + | 341 | 314 | 251 | 1230 | 150 | 40 | 63 | 0.63 | 0.49 | 0.78 | 69 |
| 16:09 | C | 116.00 | 229 | 268 | 270 | + | 342 | 312 | 246 | 1230 | 150 | 39 | 66 | 0.59 | 0.47 | 0.80 | 72 |
| 16:10 | C | 115.00 | 229 | 265 | 267 | + | 340 | 313 | 242 | 1230 | 150 | 36 | 71 | 0.51 | 0.43 | 0.85 | 73 |

The invention claimed is:

1. A system for purification of an exhaust gas from a combustion engine, wherein the system comprises in series
a heat exchanger;
a diesel oxidation catalyst; a diesel particulate filter; and
a selectively reducing catalyst;
and wherein the heat exchanger has
a first side communicating with inlet side of the diesel oxidation catalyst and being equipped with a by-pass across the first side of the heat exchanger;
a second side communicating with outlet side of the selectively reducing catalyst and being equipped with a by-pass across the second side of the heat exchanger;
at least one vane installed in the by-pass across the first side of the heat exchanger adapted to control the amount of exhaust gas flowing through the first side of the heat exchanger; and
at least one vane installed in the by-pass across the second side of the heat exchanger adapted to control the amount of exhaust gas flowing through the second side of the heat exchanger;
a housing;
a number of rectangular plates installed in parallel in the housing forming spaces between adjacent plates;
a plurality of wires disposed in the spaces between the adjacent plates, the wires being squeezed between the adjacent plates, so that two adjacent wires of said plurality of wires and the adjacent plates form channels;
the channels in every other space forming a first set of channels, the channels of the first set of channels in parallel with each other and having an S-shape, so that the channels of the first set of channels lead a gas stream from one corner of the plates to a diametrically opposite corner;
the channels in the remaining spaces between adjacent plates forming a second set of channels, the channels of the second set of channels having a shape that is a mirror image of the S-shape of the first channels of the first set of channels; and
inlets for gas streams flowing through the channels of the first and second sets of channels are positioned on the same side of the housing, thereby obtaining counter-current gas flow through the channels of the first and second sets of channels.

2. The system according to claim 1, wherein the temperature in the oxidising catalyst is controlled by means of the vane in the by-pass across the first side of the heat exchanger passing at least a part of the gas from the engine through the first side of the heat exchanger, and by means of the vane in the by-pass across the second side of the heat exchanger passing at least a part of the exhaust gas through the second side of the heat exchanger.

3. The system according to claim 1, further comprising a reducing agent addition injector, wherein the reducing agent addition injector and the selectively reducing catalyst are installed between the diesel oxidation catalyst and the diesel particulate filter.

4. The system according to claim 1, wherein at least part of the surface of the first side of the heat exchanger is coated with a diesel oxidising catalyst.

5. The system according to claim 1, wherein at least part of the surface of the filter is coated with an oxidising catalyst.

6. The system according to claim 1, wherein at least part of the surface of the filter is coated with a selectively reducing catalyst.

7. The system according to claim 1, wherein the housing has a shape of a box.

8. The system according to claim 1, wherein
each by-pass forms a by-pass channel for a corresponding by-passing stream;
the two by-pass channels form a by-pass channel box;
inlets for the two by-passing streams are placed on a common side of the by-pass channel box;
outlets for the two by-passing streams are placed on a common side of the by-pass channel box; and
each of the two by-passing streams enters at one side of the by-pass channel box and leaves at the opposite side of the by-pass channel box.

9. The system according to claim 8, wherein
the by-pass channel box with the by-pass channels is placed on the heat exchanger housing;
inlets for the gas streams flowing through the heat exchanger and through the by-pass channel box are placed adjacent to each other; and
outlets for the gas streams flowing through the heat exchanger and through the by-pass channel box are placed adjacent to each other.

* * * * *